July 28, 1959 L. D. ALDERMAN ET AL 2,896,213

MACHINES FOR CUTTING, FORMING AND FASTENING COMPONENTS

Filed Sept. 27, 1954 8 Sheets-Sheet 1

Inventors
Leon D. Alderman
Charles P. Cardani
Edwin S. Kant
Henry B. Kimball
By their Attorney
Thomas J. Ryan

MACHINES FOR CUTTING, FORMING AND FASTENING COMPONENTS

Filed Sept. 27, 1954

Inventors
Leon D. Alderman
Charles P. Cardani
Edwin S. Kant
Henry B. Kimball
By their Attorney
Thomas J. Ryan

MACHINES FOR CUTTING, FORMING AND FASTENING COMPONENTS

Filed Sept. 27, 1954 8 Sheets-Sheet 3

Inventors
Leon D. Alderman
Charles P. Cardani
Edwin S. Kant
Henry B. Kimball
By their Attorney
Thomas J. Ryan

MACHINES FOR CUTTING, FORMING AND FASTENING COMPONENTS

Filed Sept. 27, 1954 8 Sheets-Sheet 4

Inventors
Leon D. Alderman
Charles P. Cardani
Edwin S. Kant
Henry B. Kimball
By their Attorney
Thomas J. Ryan Inventors
Leon D. Alderman
Charles P. Cardani
Edwin S. Kant
Henry B. Kimball
By their Attorney
Thomas J. Ryan.

Inventors
Leon D. Alderman
Charles P. Cardani
Edwin S. Kant
Henry B. Kimball
By their Attorney
Thomas J. Ryan.

Inventors
Leon D. Alderman
Charles P. Cardani
Edwin S. Kant
Henry B. Kimball
By their Attorney
Thomas J. Ryan

MACHINES FOR CUTTING, FORMING AND FASTENING COMPONENTS

Filed Sept. 27, 1954 8 Sheets-Sheet 8

Inventors
Leon D. Alderman
Charles P. Cardani
Edwin S. Kant
Henry B. Kimball
By their Attorney
Thomas J. Ryan

United States Patent Office 2,896,213
Patented July 28, 1959

2,896,213

MACHINES FOR CUTTING, FORMING AND FASTENING COMPONENTS

Leon D. Alderman, Manchester, Charles P. Cardani, Hamilton, Edwin S. Kant, Melrose, and Henry B. Kimball, Marblehead, Mass., assignors to United Shoe Machinery Corporation, Flemington, N.J., a corporation of New Jersey Application September 27, 1954, Serial No. 458,312

33 Claims. (Cl. 1—102)

This invention relates to machines for cutting, forming, and fastening articles having oppositely extending flexible end portions. More particularly, this invention is concerned with the provision of an electrical component inserting machine of the same general type as that disclosed in a copending application Serial No. 436,458, filed June 14, 1954, in the names of Charles P. Cardani and Joseph Harrington, Jr., now Patent No. 2,791,772, dated May 14, 1957. While the invention is herein primarily illustrated as embodied in a machine for cutting, forming and inserting the leads of lead bearing resistors in a wiring board, it is not thus limited in use, it being readily recognized that various novel features thereof are useful in installing other lead bearing electrical components, for example, condensers, diodes, transistors and the like, and may also be well adapted to processing non-electrical articles having pliant projections.

The machine disclosed in the application referred to above is provided with means including a stationary anvil for supporting a wiring board or a panel having a printed circuit thereon, and includes a head having pneumatically actuated mechanism therein for sequentially bending and inserting the wire leads of successive components, said leads being thrust endwise through preformed holes in the panel to be upset on the anvil. While performance of that machine has been found to be quite satisfactory in most respects, it is recognized as not especially well suited to automatic operation in an assembly line, nor is it readily adjustable to meet a number of changeable operating conditions that are likely to be encountered in commercial use.

In the light of the foregoing comment, it is an object of this invention to provide an improved and highly adaptable component inserting machine of the type indicated which shall be capable of high production at a station of an automatic assembly line as well as being easily adjustable for reliable independent operation.

With this and other objects in view, one feature of the present invention resides in the provision, in a compact machine head, of individually operated cutting and outside former tools in contrast to the earlier disclosed construction in which the outside formers respectively include integral lead shearing blades. As shown herein, a reciprocable driver bar for applying a cut and formed component is now provided for independently actuating the separated cutting and outside former tools, although, as in the prior construction, projection of the grooved outside former tools beyond the machine head is still relied upon to guide a component during the lead inserting stroke of the driver bar. Disassociating the outside formers from the shearing tools enables a component to retain its required lead lengths and yet advantageously be installed in closer relation, if need be, to other components which may already be mounted on the wiring board. This is so since the thickness of both outside formers need not extend from the shoulder formed on the lead to its cut end but only slightly beyond the formed shoulder of the lead.

Another feature of the invention is the incorporation, in a machine having instrumentalities for operating on the oppositely extending leads of a row of components arranged in side by side relation, of mechanism comprising a pair of notched or toothed feed wheels for advancing a series of the components toward the operating zone of the machine, the notches of said wheels acting precisely to space and aline the lead ends of successive components, and means for rotating said wheels in time relation to the operation of said instrumentalities. As may readily be appreciated, this feeding mechanism is especially well suited to the processing of components belted or bundled in accordance with the package disclosed in a pending application Serial No. 428,927, filed May 11, 1954, in the names of Joseph Harrington, Jr., et al., now abandoned. The leads of successive packaged or unpackaged components, even if the latter are all of one size in a raceway or chute, are generally not spaced apart to the same extent, particularly at their ends, since they are pliant and frequently will have been bent at least slightly. As herein shown, the pitch of the feed wheel teeth is adapted to assure that lead extremities of each component, whether it comes, for example, from a commercial lot having a .125 inch body diameter or .190 inch body diameter, will be alined by being seated between adjacent and corresponding teeth of the feed wheels.

A further feature of the invention consists in the novel combination in a machine for cutting, forming, and inserting the leads of lead bearing components, of an anvil and lead clinching mechanism in register therewith, a frame for supporting the anvil and said mechanism for cooperative movement with respect to one another, said mechanism being adjustably supported by the frame for turning movement about an axis passing through the anvil, and means for supporting a work piece between said anvil and said mechanism for receiving the component leads to be clinched. As herein shown, a printed wiring board mounted on a pallet is borne by continuously operated conveyor means and presented in a predetermined position above the anvil in order that preformed holes in the board may receive endwise the formed leads. The pallet is stayed in its appropriate position for operation on the board by suitable means not herein completely shown but fully disclosed in a copending application Serial No. 458,328, filed September 27, 1954, in the names of Adolph S. Dorosz et al., now Patent No. 2,772,416, dated December 4, 1956, the pallet temporarily being disassociated from the conveyor means for this purpose. Obviously, in lieu of a pallet any convenient board supporting frame or rest may be used to position a circuit in correct relation to the machine as adapted for independent operation apart from a conveyor. Since, for example, wiring chassis of different thicknesses may be employed for different circuits, that components of different sizes may be used, and that it may be desirable to clinch leads of different lengths with more or less tightness, invention is to be recognized in providing the machine of this novel combination with independent means for adjusting both the length of the reciprocable stroke of the anvil and of the cooperative lead clinching means.

The above features and others, including an electrical testing anvil and certain modifications to adapt a machine for handling non-cylindrical components, together with various details of construction and novel arrangements of parts, will now be more fully described in connection with an illustrative machine in which the invention is embodied and by reference to the accompanying drawings, in which.

Figures 13, 14:
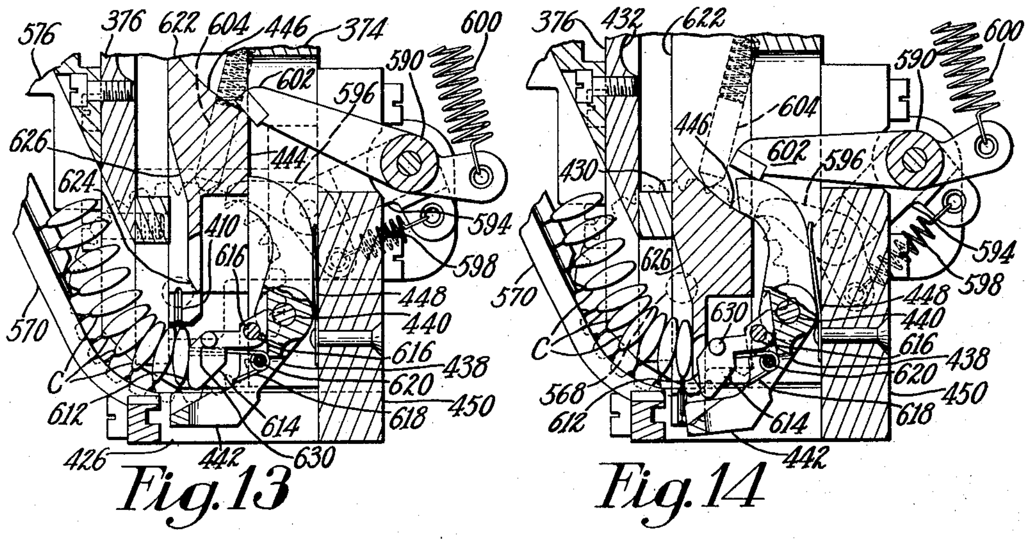
Figures 15, 16:
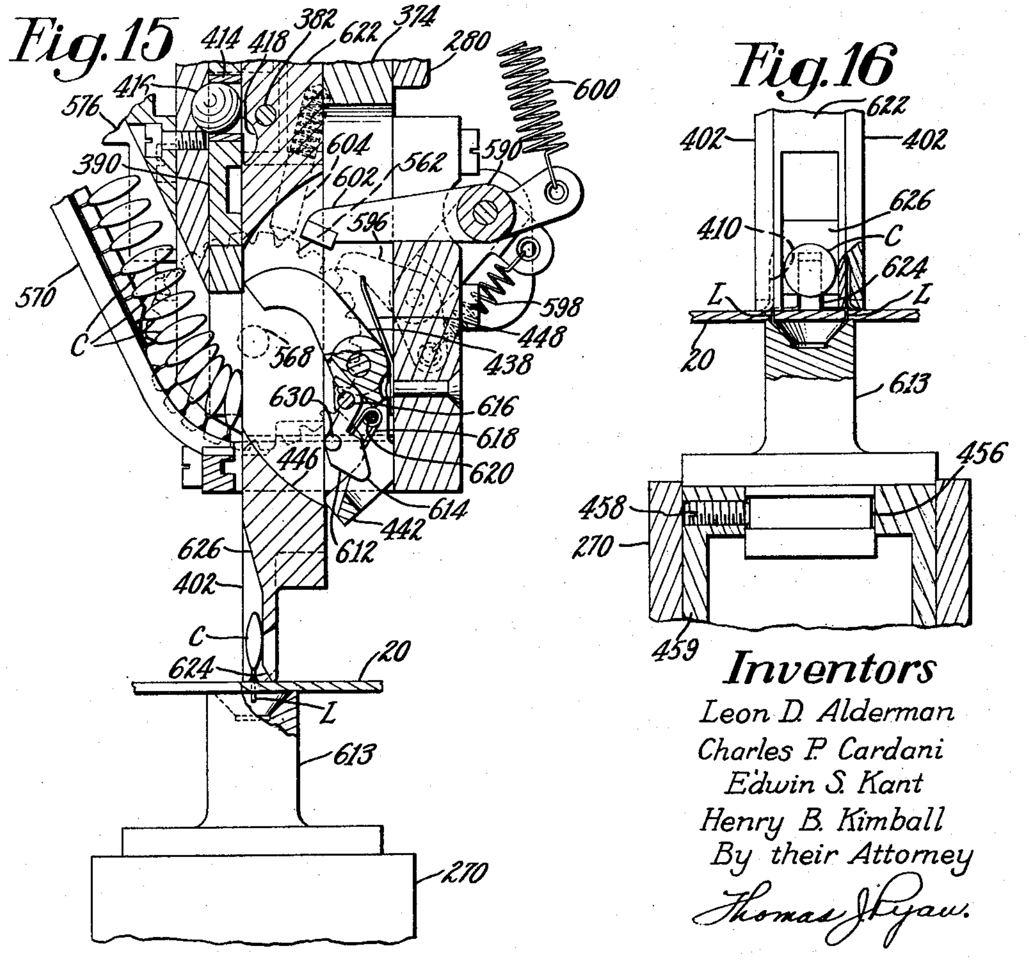

Figs. 13, 14 and 15, respectively, show in successive operating stages sectional views of the lower portion of a machine head having certain parts modified for installation of lead bearing components of the sort having body portions in the form of disks or capsules, for example, certain of the hermetically sealed, fixed capacitors as shown, and the like; and Fig. 16 is a front elevation, partly in section, of parts shown in Fig. 15.

As has been indicated, the illustrative machine is adaptable for independent use under manual control to apply components, or may, as herein shown, be adjustably positioned at one of the operating stations of an automatic assembly line. In either case, appropriate means (for instance simple fixed board mounting rests, or the pallets and associated positioning mechanism fully disclosed in said copending Dorosz et al. application, and herein partially shown and described), is provided for supporting a wiring board 20 (Fig. 1) in predetermined position relatively to operating instrumentalities later to be described, of a machine head 22, so that components may be formed and applied with their leads L extending to or through the wiring boards for suitable connection with circuity thereon. It will suffice for present purposes to recite as included within the illustrative board supporting means, and shown in Fig. 1, a pallet 34 on the upper side of which the board is mounted, a guideway 146 adapted to receive a pair of positioning pins of the pallet, one of which is indicated at 92, cams 178 and 220 for disassociating pallets from a pair of conveyor belts 30, 30, guide bars 74, 74 on which the belts respectively run, and a bracket 154 on which is supported means including a clamping arm 212 for moving the pallet sidewise into fixed operating position with respect to an abutment 150 that is then engaged by the pin 92 and a yieldable detent 222. In order to locate the component inserting instrumentalities of the illustrated machine in accurate register with the appropriate pair of preformed holes in the presented board 20, and in order to assure convenient flexibility for operation on different wiring board circuitry, a hollow C-frame 260 (Fig. 1) is arranged to be clamped in different positions about an opening 262 in a horizontal plate 264 constituting part of a conveyor frame or other suitable supporting means. For this purpose, a clamping bolt 266 extends upwardly through a crossbar 268 spanning the opening 262 and has its upper end threaded into an anvil housing 270. The latter is bored to receive a pair of rods 272, 272 which respectively extend into opposite sides of the C-frame. Accordingly, a single handle 274 connected at one end to the head of the bolt 266, may be used to turn it when adjusting the machine to establish a selected operating position about a vertical axis, and widthwise and/or lengthwise of a wiring board.

Figure 1:
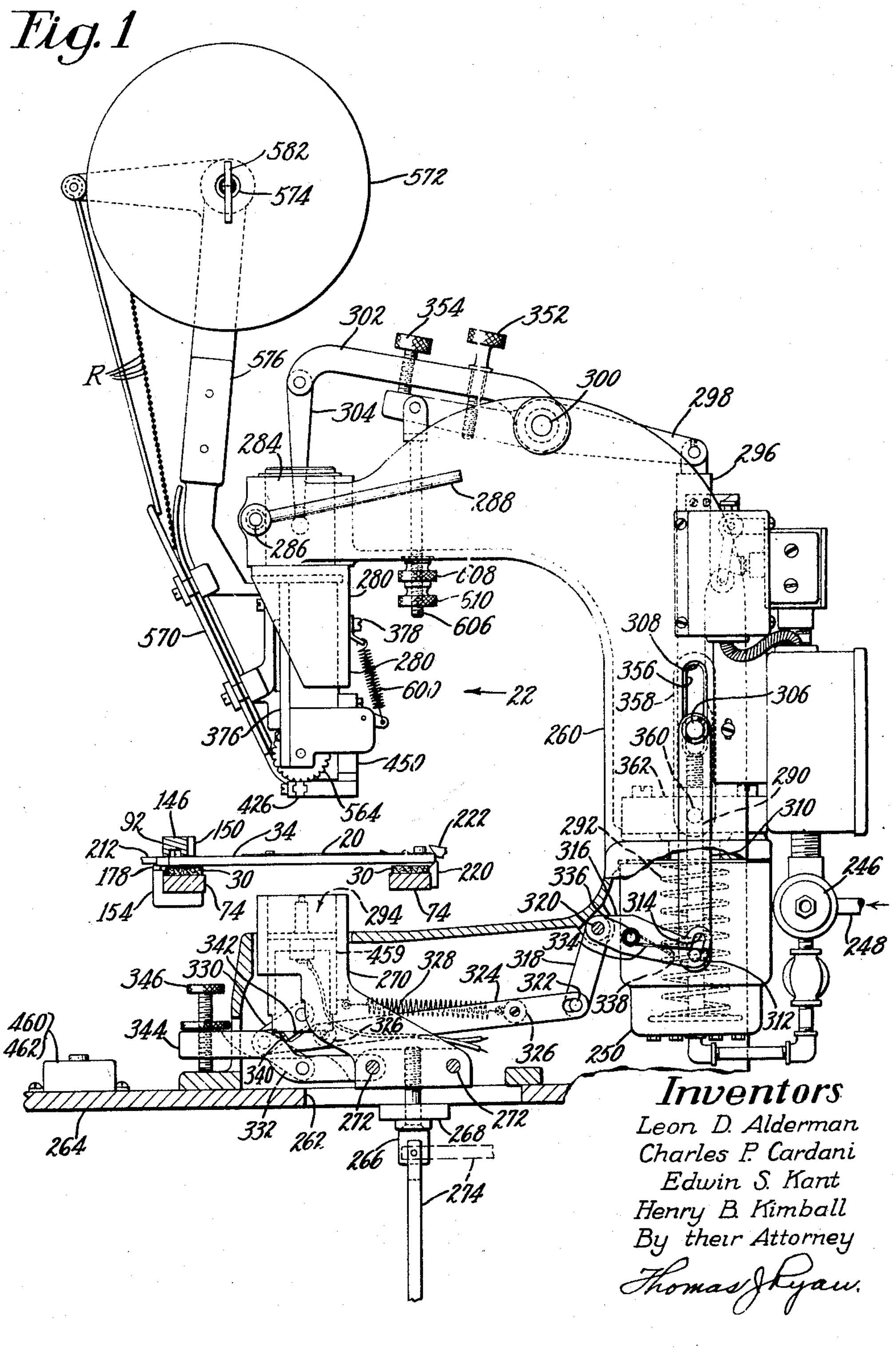
Fig. 1 is a view in side elevation, with portions broken away to reveal construction, of a component cutting, forming and inserting machine in which the invention is embodied, the machine being shown at rest and as mounted at an assembly line station.

The C-frame 260 has an overhanging end portion split to provide a clamp type cylindrical bearing for receiving a sleeve 280 which supports the component applying head 22. Confronting cheeks 284, 284 of the frame are provided with alined bores having a clamping bolt 286 threaded therein operated by a hand lever 288 to enable the component applying head 22 to be independently adjustable about a vertical axis. A solenoid-operated valve 246 (Figs. 1 and 12) is arranged to be actuated by electrical means hereinafter to be described to control the admission of air under pressure via a hose 248 to an air motor 250 mounted in the frame 260. Upon actuation of the motor its diaphragm (not shown) is caused to force its push rod 290 upward against the resistance of a return spring 292 in order to effect cooperation between a vertically reciprocable anvil generally designated 294 slidable in the bracket 270 and the inserting instrumentalities of the head 22. Operative connections between this head and the push rod 290 comprise an upright extension link 296 for threadedly receiving at its lower end the upper end of the rod, a lever 298 pivotally mounted on a fulcrum pin 300 journaled in the frame 260 and having its rear end pivotally secured to the upper end of the link 296, a lever 302 also pivotally mounted on the fulcrum pin 300 and a ball-ended link 304 pivotally suspended from the front end of the lever 302. For actuating the anvil 294 the link 296 carries a rod 306 which extends transversely through slots 308, 308 formed in opposite sides of the frame 260. Depending from opposite ends of the rod 306 is a pair of parallel links 310, 310 (one only shown) the lower ends of which respectively have a pin 312 that is received in a slot 314 in each of a pair of rearwardly extending arms 316 of a bell-crank lever 318. The latter is pivoted on the C-frame at 320 and has a forwardly extending arm carrying a pin 322 arranged to be received in slots formed in corresponding ends of parallel toggle operating bars 324 (one only shown) which are spaced by rolls 326, 326. A tension spring 328 connecting a roll 326 and the anvil bracket 270 assists in assuring that anvil actuating toggle links 330, 332 which have their knee joint connected to the front ends of the bars 324 will normally return to their initial broken condition as shown in Fig. 1.

In order to assure that the toggle links 330, 332 straighten during the initial portion of the upward movement of the push rod 290 so that the upper end of the anvil will be in engagement with the under side of the printed wiring board in readiness to support it during inserting operations of the head 22, a rather stiff wire torsion spring 334 is mounted on a pin 336 in one of the arms 316, the ends of this spring respectively bearing against a pin 338 extending from the inside of that arm 316 against one of the pins 312. The arrangement accordingly is such that after considerable toggle straightening to raise the anvil in the first part of a machine cycle substantially to work engaging level, the spring 334 finally yields as the pins 312 are moved to the upper ends of their slots 314. The anvil is also maintained to work engaging position until that time in the down stroke of the push rod 290, subsequent to the pins 312 again engaging the lower ends of the slots 314, when the pin 322 has been shifted to the left-hand end (as viewed in Fig. 1) of its slots in the bars 324. The anvil is limited in its downward travel by a stop 340 integral with the toggle link 330, a side of this stop engaging the bottom of the anvil as shown in Fig. 1. A side 342 of this stop is arranged to prevent travel of the toggle beyond straightened condition by its engagement with a different portion of the bottom of the anvil.

In order to anticipate and provide for various adjustments which may be needed under different operating conditions the machine is provided with several mechanisms that normally need not be readjusted until a new production run is to be made. The anvil 294, for example, may have the upper limit of its work engaging stroke modified to accommodate manufacturing variations, bowing of wiring boards, different thicknesses of wiring boards or different components to be acted on, or for other reasons. For this purpose there is pivotally mounted on the front rod 272 a lever 344 (Fig. 1) which pivotally supports the lower end of the toggle link 332 and extends forwardly threadedly to receive a knurled adjusting screw 346 that abuts the frame 260 endwise. Another mechanical adjustment commonly found useful in setting up the machine is the provision of means for changing the depth of drive of the head 22. Thus the lever 298 and the lever 302 are made to function as a single composite lever capable of imparting a substantially constant stroke having variable limits to a vertical driver bar 350 (Figs, 2, 3, 8) depending from the ball end of the link 304, the lever 298 being coupled to the lever 302 by a thumbscrew 352 rotatable in the latter and in an adjustable angular relation as determined by a thumbscrew 354 threaded through the lever 302 for endwise engagement with the lever 298. For assuring that the lower or inserting end of the driver bar 350 (Fig. 6) may, at the bottom of its stroke, have appropriate heightwise relation to the wiring board, a further initial adjustment is normally made prior to actually setting the thumbscrews 352, 354, namely threading the link 296 onto the push rod 290 to just the extent required to enable the upper end of vertical slots 356 (Fig. 1) effectively to determine the limit of upward movement of the transverse rod 306 within the displacement range of the motor 250. To this end the slots 356 are formed in a pair of vertical links 358 respectively which are trunnioned on pins 360 extending into a block 362 secured to the C-frame.

Figures 2, 3:
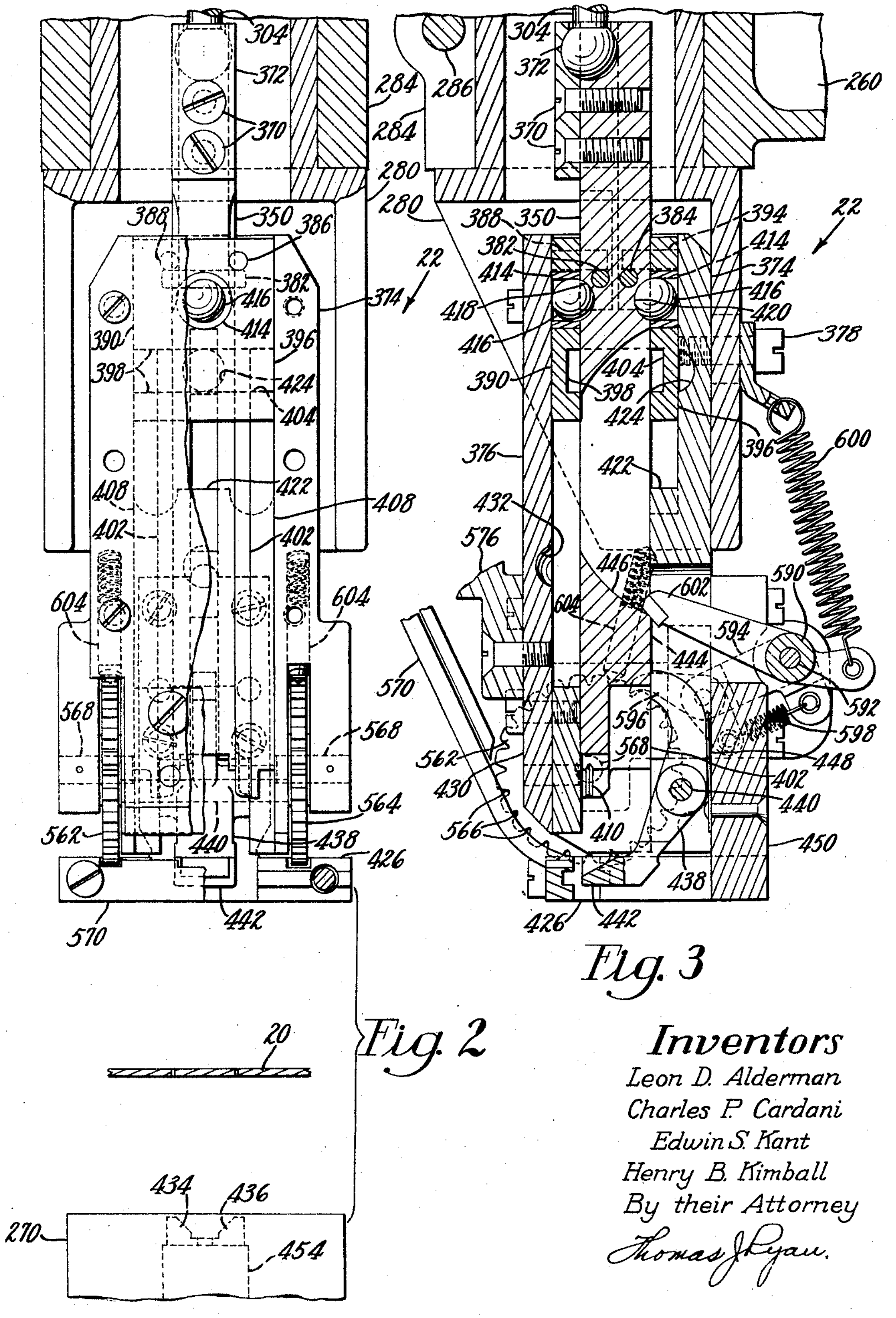
Fig. 2 is a view in front elevation, and partially broken away, of the head of the machine shown in Fig. 1, indicating its relation to the work and the anvil.
Fig. 3 is a vertical section of the machine head shown in Figs. 1 and 2.
Figure 8:
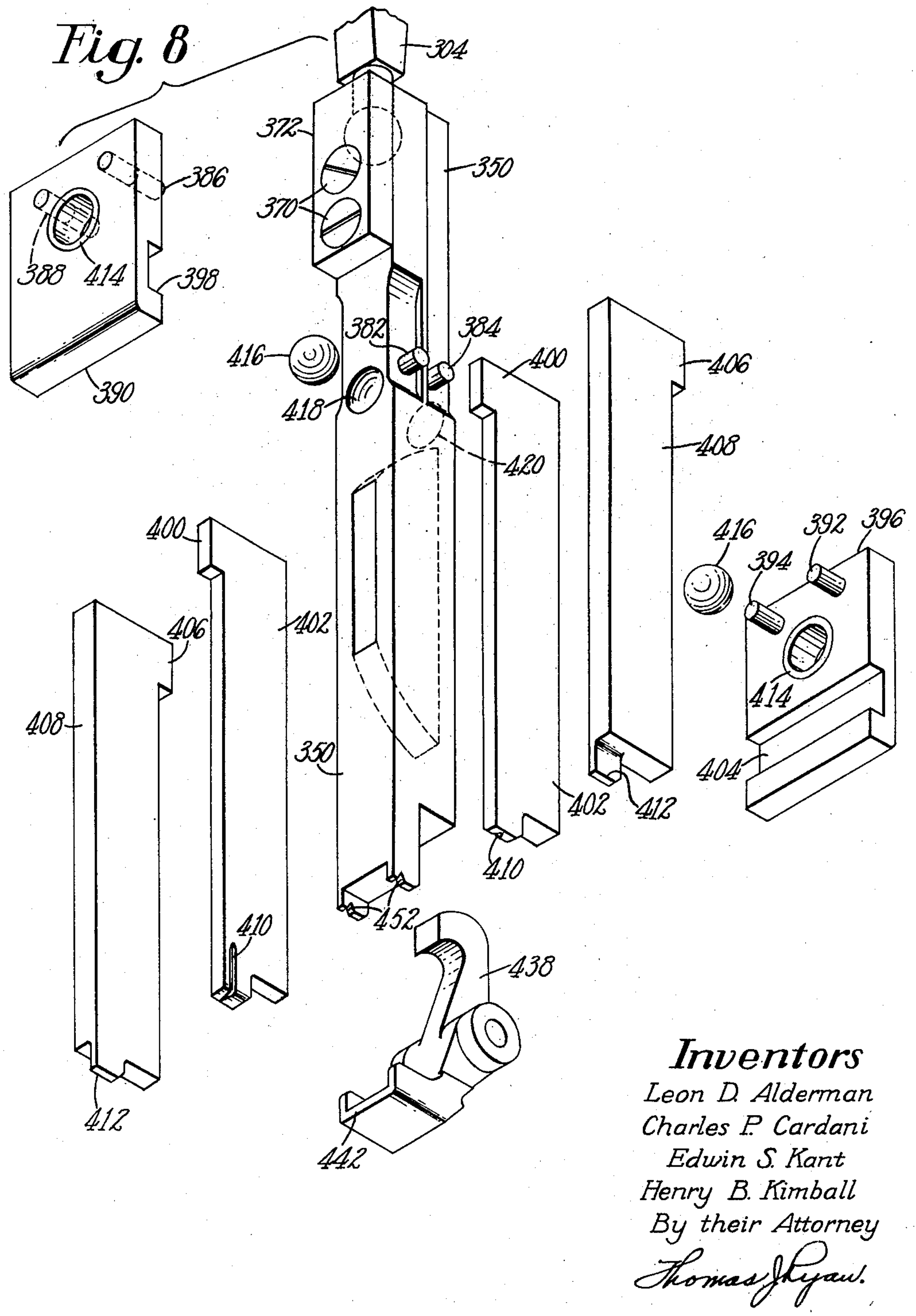
Fig. 8 is an exploded view of the operating instrumentalities in the head shown in the preceding figures.

The machine head 22 herein shown (Figs. 2 and 3) has its driver bar 350 secured to the ball ended link 304 by means of screws 370 extending through a clamping plate 372 and into the bar, the ball end being nested in matching spherical recesses formed in the bar and in the plate 372. As will next be described it is a single down stroke of the driver bar which is relied upon for actuating means for cutting and forming the leads L of each of the successive resistors R, or the like, which are to be inserted. In contrast to the earlier disclosed construction above mentioned, the driver bar 350 is arranged for independently actuating the cutting and forming instrumentalities now provided. A three-sided rectangular casing 374 having internal surfaces for guiding the bar is provided with a front cover plate 376 and is adjustably affixed heightwise, for a reason later stated, by means of clamping screws 378 to a flat lower portion of the sleve 280. As perhaps best shown in Fig. 8, the bar 350 is doweled and provided with an oppositely projecting front pick-up pin 382 and a similar rear pick-up pin 384. Ends of the pin 382 are arranged to cooperate with a pair of dowel pins 386, 388 affixed in a flat front member 390, and ends of the pin 384 are arranged to cooperate with a pair of dowel pins 392, 394 in a flat rear member 396. The members 390, 396 correspond substantially in shape and function and are respectively positioned heightwise initially in a machine cycle by the return or up-stroke of the driver bar pins 382, 384 acting to engage the dowel pins to lift the members as indicated in Figs. 2 and 3. The member 390 has a mortise 398 for receiving tenon portions 400 of a pair of outside formers 402, 402, and in like manner the member 396 has a mortise 404 for receiving tenon portions 406 of a pair of cutters 408, 408. It accordingly will be understood that the formers 402 and cutters 408 may be removed to permit, upon occasion, the substitution of modified formers and cutters. Each of the formers 402 has a vertical V-shaped guide groove 410 for accommodating a lead L after it has been cut to appropriate length by a shear blade 412 of the adjacent cuttter 408. Also, for a purpose soon to be described, each of the members 390, 396 is bored to receive a hardened bushing 414 which accommodates a portion (greater than half) of a ball detent 416. As shown in Fig. 3, when the machine is at rest the front detent 416 is more than half seated in the front bushing 414 and partly nested in a matching spherical cavity 418 in the front of the driver bar. The rear detent 416 in like manner is more than half seated in the rear bushing 414 and only partly nested in a rear drive bar cavity 420.

Figure 4:
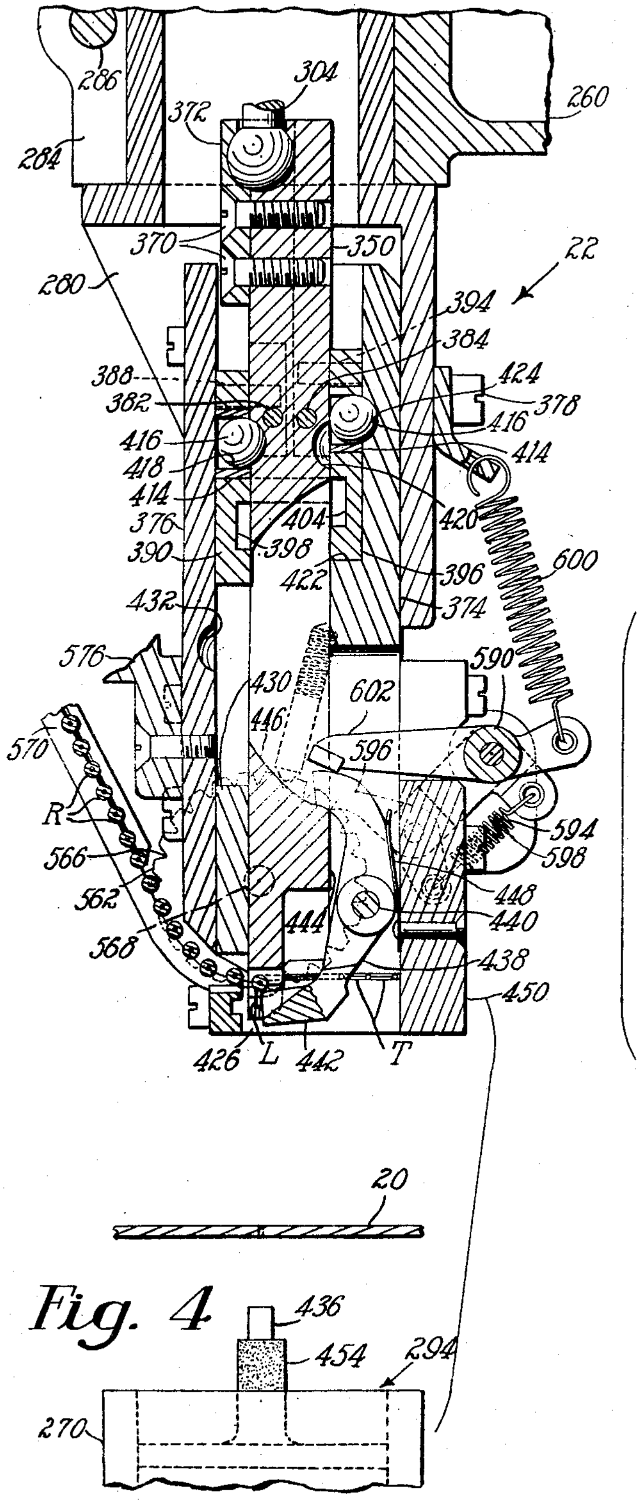
Fig. 4 is a section similar to Fig. 3 but showing the operating parts at a later stage in their cycle of operations.
Figure 5:
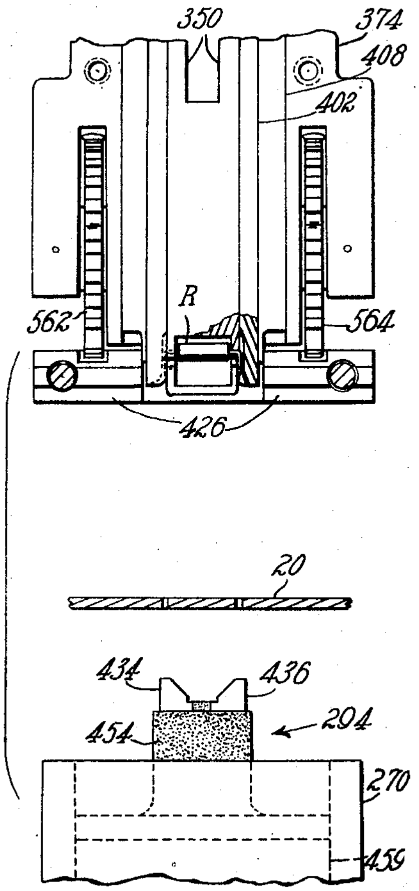
Fig. 5 is a front elevation of certain of the parts shown in Figs. 3 and 4.

During the initial portion of the down-stroke of the driver bar, i.e., in shifting from the position shown in Fig. 3 to nearly that shown in Fig. 4, the members 390, 396 are caused to travel downwardly simultaneously until the latter engages a stop shoulder 422 of the casing 374, the rear ball detent 416 then being caused by the descending driver bar cavity 420 to be cammed rearwardly into a spherical cavity 424 which, together with the rear bushing 414, is just large enough to seat the ball detent, as shown in Fig. 4. The down stroke of the driver bar is accordingly not impeded. The arrangement is such that when the cutters 408 have thus been arrested their blades 412 have respectively cooperated with a pair of spaced shear blocks 426, 426 (Figs. 5, 7) secured to the bottom of the casing 374 to cut off the oppositely extending leads L at appropriate distances from the body of a resistor R which has been fed onto the shear blocks by positively acting means hereinafter to be described.

Figures 6, 7:
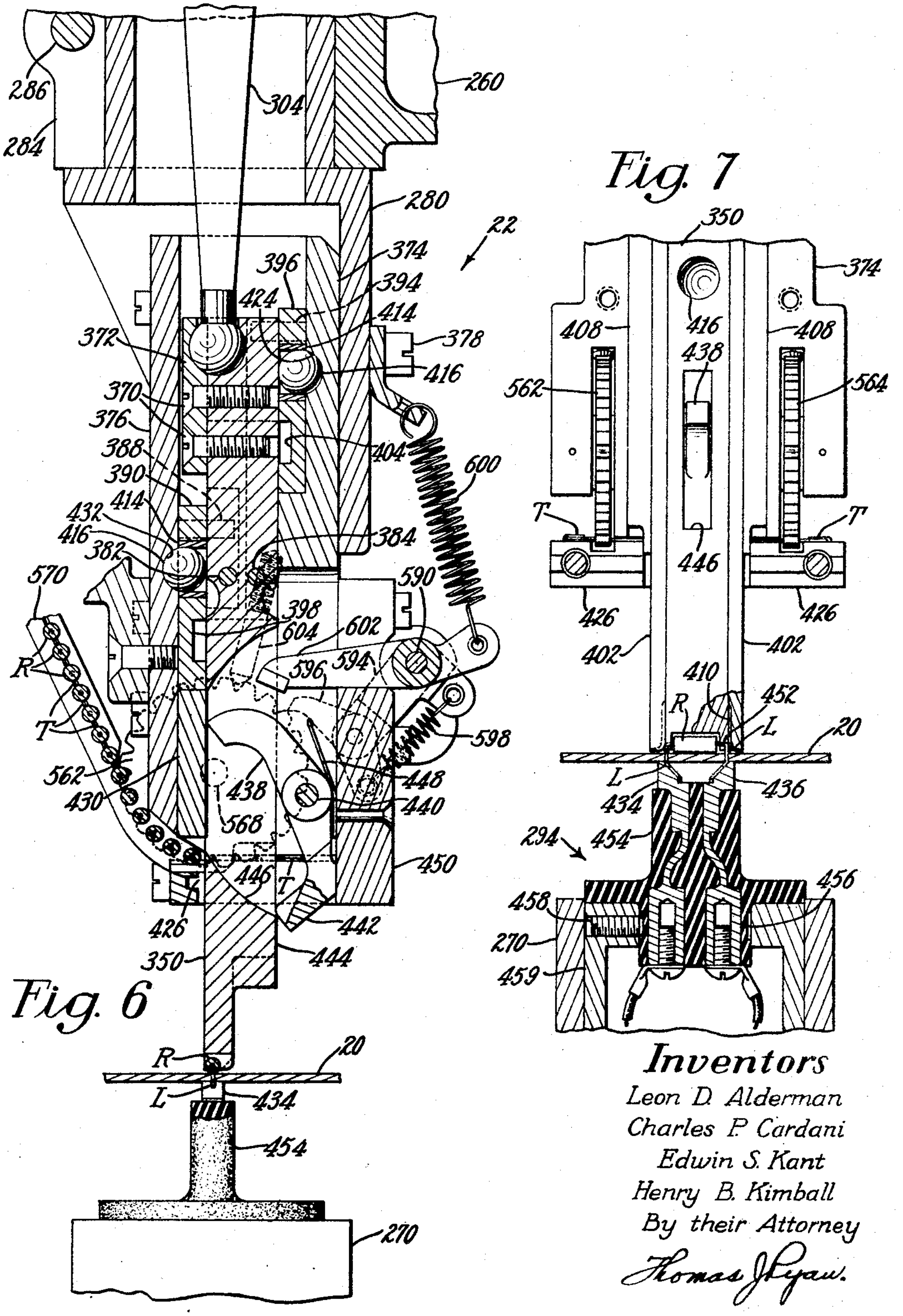
Fig. 6 is a section similar to Figs. 3 and 4 but showing head operating parts at a still later stage in the cycle.
Fig. 7 is a side elevation, partly in section, showing anvil structure and the relative position of parts when in the stage indicated in Fig. 6.

The descending driver bar 350 continues to carry the member 390 and its outside formers 402 downwardly until, as shown in Fig. 6, the member engages a stop in the form of a flat spacer block 430 secured to the front cover plate 376, the block 430 also serving to guide the bar 350. At the instant of this engagement, in order to clear the driver bar for its continuous operating down stroke, the front detent 416 is caused by the cavity 418 to be forwardly cammed into a spherical cavity 432 in the cover plate. The heightwise adjustability of the head 22 including the block 430 permitted by the setscrews 378 allows the lower limit of travel of the outside formers 402 to be changed according to the dictates of a particular component or wiring board. The cavity 432, together with the front bushing 414, is just large enough to seat the front ball detent as shown in Fig. 6 and the driver bar 350 is accordingly thereafter free to advance alone a short distance to thrust the then formed leads L ending respectively through the preformed holes in the positioned wiring board and against clinching terminals 434, 436 (Figs. 2 and 7) of the anvil 294. To avoid affecting electrical characteristics of a component, formation of the leads is effected without engaging the body of the component, the outside formers 402 acting in cooperation with an inside former 438 much in the manner disclosed in the Cardani et al. application above referred to, the inside former being pivotally mounted on a horizontal pin 440 (Fig. 2) affixed in the lower portions of the sides of the casing. As viewed in Fig. 3, when the machine is in rest condition the lower U-shaped end 442 of the inside former is arranged to support the leads L of a resistor next to be formed for insertion, without contacting the resistor body, a flat upper end of the inside former then being positioned by engagement with a flat portion 444 on the back of the driver bar. During lead formation the driver bar and formers change relative positions from those shown in Figs. 2 and 3 to those shown in Figs. 4 and 5, concurrent ascent of the anvil also being indicated. For maintaining the upper end of the inside former in cooperative relation with the portion 444 and with an arcuate cam surface 446 (which, if desired, may simply be a corner portion) formed in the back of the driver bar, a leaf spring 448 is provided which is affixed at one end to a block 450 screwed to the back of the casing 374. As will be apparent from a comparison of the progressive views of Figs. 4 and 6, counterclockwise movement of the inside former is effected by the down stroke of the driver bar 350, after being initiated by the spring 448, to clear the path of the lower and recessed end of the bar so that its notches 452, 452 (Fig. 7) may bear downwardly on the lead shoulders adjacent to the resistor body.

In installing many different articles and components by clinching their projecting wire ends toward or apart from each other at one side of a work piece receiving them it is satisfactory to use an ordinary solid metal clinching anvil. Frequently a solid anvil may be used in the machine organization being described. However, when assembling electrical equipment, especially electronic apparatus, it is highly important to know that a component has without fail been inserted and clinched as required. The unique "split" type of anvil herein disclosed and having the electrically isolated clinching terminals 434, 436 (Figs. 7 and 12) serves to assure that a resistor or the like will be inserted and clinched in a cycle as required or the machine will automatically cease to operate. As shown in Fig. 7, these conducting anvil terminals are separately mounted or embedded in a non-conducting plastic mold 454 which has a circular groove 456 in its base for receiving an end of a setscrew 458 threaded in a bore formed in the upper end of a hollow cylinder 459. The latter is reciprocably mounted in the bracket 270 and has pivotal connection with the upper end of the toggle link 330. In order to have access to limited space which may be available immediately beneath the wiring board, the mold 454 and its terminals 434, 436 are narrow in configuration. If the head 22 is adjusted about a vertical axis the anvil terminals should also be adjusted accordingly and then locked by resetting the setscrew 458. Without risk of modification to the electrical characteristics of the resistor R or other component, its leads when properly cut, formed and clinched are caused to be thrust endwise by the driver bar through the wiring board to contact the anvil terminals 434, 436, respectively, and complete a circuit through the driver bar 350.

Figure 12:
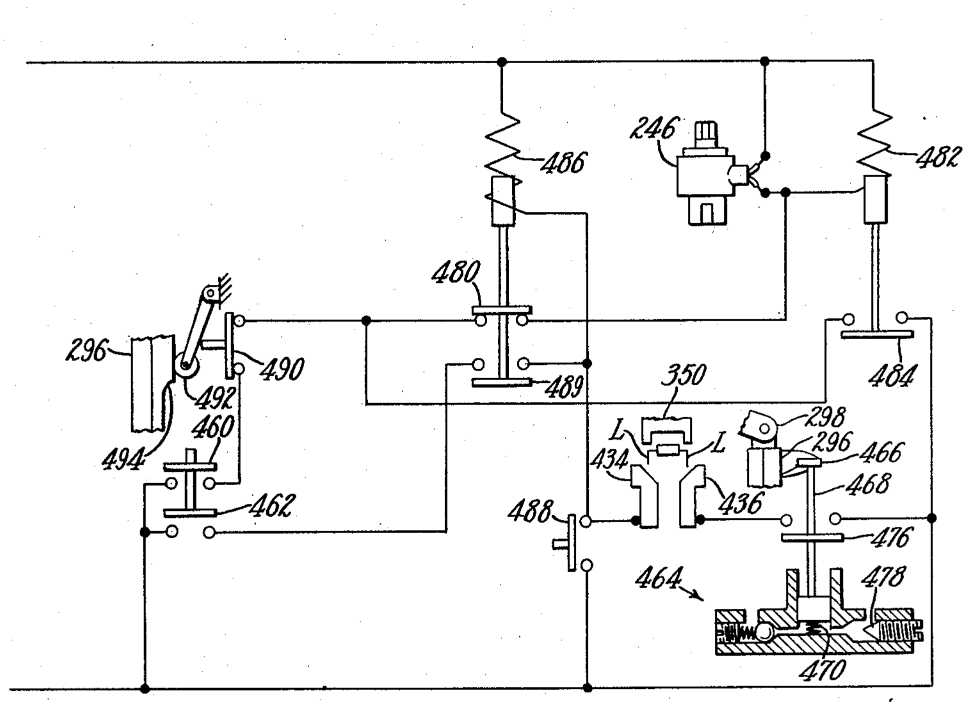
Fig. 12 is a schematic wiring diagram illustrating a test means with which the machine may be provided for assuring proper installation of each component.

The circuit just mentioned may take any one of a number of forms for controlling the component inserting machine or otherwise indicating, as by means of a pilot light, for example, that the leads of a component have or have not been inserted and clinched adjacent to a wiring board. The Dorosz et al. application above referred to discloses in its Fig. 25 one electrical hookup of the machine when automatically actuated and when fitted with an electric testing anvil. It will be understood that the exemplary machine when fitted with an ordinary solid anvil may be operated upon actuation of a single manually operable switch for controlling the solenoid operated valve 246. Fig. 12 shows a schematic wiring diagram for the machine when fitted with the testing anvil 434, 436 and will now be referred to to explain one way in which a circuit including this anvil may advantageously be tied in with a simple operator controlled circuit for actuating the machine. A starting switch 460, together with a later mentioned contact 462, is actuated to close a circuit through a normally closed lever operated switch 490 and a relay contact 480 thus to energize the solenoid of the valve 246 and cause the motor 250 to force the push rod 290 upward thereby effecting a downward operating stroke of the driver bar 350. The switch 490 opens after the start of the machine as permitted by a cam roll 492 cooperative with a cam 494 formed on the link 296 and accordingly breaks the starting switch circuit to prevent recycling of the machine by any accidental actuation of the switch 460 before the driver bar has executed a complete operating and return stroke. The solenoid of the valve 246 is maintained energized until the driver bar completes its inserting stroke thereof. The switch 490 opens since the starting switch 460 is also effective simultaneously to energize a solenoid 482 that closes a contact 484 to provide a live circuit through the relay contact 480. In completing its inserting stroke, if the driver bar 350 properly inserts the component leads L they will serve with the driver bar to bridge the anvil terminals and complete a circuit that energizes a solenoid 486 which breaks the contact 480 and hence permits closing of the valve 246 allowing the spring 292 to retract the driver bar from the wiring board 20.

Since an undesirable premature return stroke of the driver bar might be effected prior to clinching and immediately upon initial contact of unclined lead ends with the terminals 434, 436, a time delay means is introduced into the anvil circuit to assure complete clinching. For this purpose, as herein shown, a conventional time delay switch 464 (Fig. 12) is provided to delay the return down stroke of the link 296. An arm 466 secured to the latter normally engages the upper end of a piston rod 468 carrying a contact 476, a compression spring 470 urging the piston upwardly in a cylinder formed in the switch housing. The arrangement is such that the arm 466 rises faster than the piston rod 468 during the inserting stroke of the driver bar 350, the piston rising at an adjustable rate determined by the inflow of air into the switch housing as controlled by a needle valve 478. By reason of the contact 476 holding open the anvil circuit even though the lead ends are contacting the terminals 434, 436, clinching is necessarily completed before the contact is caused by the arm 466 to be lowered to close the anvil circuit and effect return of the driver bar. If the driver bar failed to insert a component R or either lead L failed to make contact with or to be clinched upon a terminal 434 or 436, the bar would remain in its lowered position thus indicating that fact and enabling correction to be made. A release switch 488 may then be actuated to energize the solenoid 486 and effect retraction of the driver bar.

When the solenoid 486 is energized a contact 489 is closed. Accordingly, if an operator did not release the starting switch 460, the solenoid 486 would remain energized by the current flowing through the contact 462 and the contact 489, and the air valve solenoid circuit would remain broken at the contact 480 to prevent recycling of the machine until the starting switch 460 is released.

Figure 9:
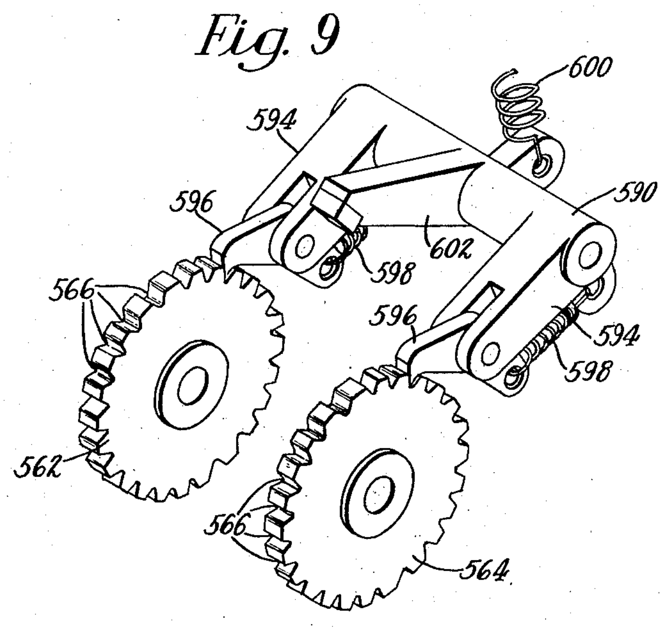
Fig. 9 is a perspective view of parts of the component feeding mechanism associated with the machine head.
Figure 10:
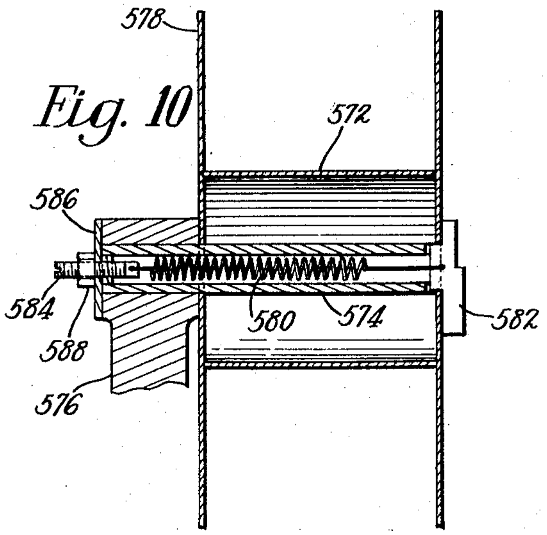
Fig. 10 is a vertical section illustrating the detachable mounting of a component supplying reel which may be associated with the head.
Figure 11:
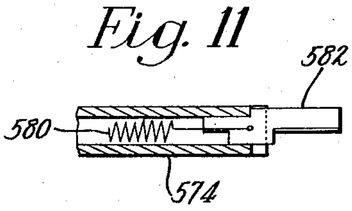
Fig. 11 is a detail of parts shown in Fig. 10 but arranged to permit easy demounting of the reel.

Operation of an inserting head of the type described results in manipulation of the end portions of leads without disturbance to the bodies of the components. The machine is accordingly preferably provided with means whereby a supply of resistors R or the like can be fed in a row in regularly spaced side-by-side relation to the head 22 for automatic insertion. One convenient arrangement for assuring such systematic supplying of components one by one is the belted bundling disclosed in an application Serial No. 428,927, filed May 11, 1954, in the names of Joseph Harrington, Jr., and Donald E. Houser. According to this arrangement, as indicated herein, each component has the opposite ends of its flexible leads suspended from a strip of folded tape T (Figs. 4, 6 and 7), the body of a component and adjacent lead portions being fully accessible to forming and cutting tools, for example, and individual components being arranged in substantially parallel relation. Regardless of the particular component package or supplying means used, it is essential to accurate and reliable lead formation and insertion that leads of successive components come onto the shear blocks 426, 426 so that the cut lead portions to be formed will be received in the groove 410 and the lead shoulders will be accommodated in the notches. 452. Better to assure that successive leads may thus be acted on by the head 22, a pair of feed wheels 562, 564 (Figs. 2 and 9) is provided, the wheels respectively having the same number of evenly spaced V-shaped grooves 566. The wheels are rotatably mounted on shafts 568 journaled in opposite lower sides of the casing 374, and adjacent grooves of each wheel are peripherally spaced to receive the lead ends of successive, adjacent components. Since the wheels are maintained in phase during rotation by means to be explained, the inclined sides of a pair of grooves 566 corresponding in phase serve to straighten, if need be, the opposite leads of a component before positively feeding them to a position in register with the head operating instrumentalities. As herein shown (Fig. 4) there is the bottommost pair of grooves 566 which accurately aline oppositely extending leads of successive components with these instrumentalities, a number of adjacent grooves cooperating with a like number of succeeding or trailing leads progressively to advance the row of components being supplied. In this way any unwanted bending of the oncoming flexible leads is avoided during feeding through a raceway 570 (Fig. 1) affixed to the front of the shear blocks 426. The delivery end of the raceway 570 is arcuate and its curvature approaches that of the perimeter of the adjacent feed wheels. Unwinding of a supply reel 572 (Figs. 1 and 10) on which the belted components are wound is accordingly effected without difficulty. Restraining means is employed to prevent overfeeding which might otherwise occur with a flexible component package. The reel 572 is rotatably supported on a tubular sleeve 574 (Fig. 10) that is mounted in a bore formed in the upper end of a bracket 576 affixed both to a cover plate 376 and the raceway 570. For adjustably restraining overtravel of the reel while supplying components to the machine a brake is afforded by means of a reel side 578 having frictional engagement with the bracket 576 as effected by a tension spring 580 within the sleeve. One end of this spring is connected to a reel releasing key 582 and the other end is connected to an end of a setscrew 584 threaded through a plate 586. A nut 588 on the setscrew serves to lock it in adjusted position. The releasing key 582 also provides braking by its frictional engagement with the reel when in the relative position shown in Fig. 10. Fig. 11 indicates how the key may be partially inserted endwise in the sleeve 574 to permit easy demounting of an empty reel and replacement with a full one without changing the degree of overtravel restraint.

For automatically unwinding the reel 572 and successively positioning the components to be formed and inserted, the feed wheels 562, 564 are rotated step by step counterclockwise as viewed in Fig. 3 by driver bar controlled mechanism now to be explained. A bellcrank lever 590 (Figs. 3, 4, 6 and 9) is pivotally mounted on a pin 592 journaled in the block 450. Spaced arms 594, 594 of the lever 590 respectively carry pivotal pawls 596, 596. Corresponding ends of the pawls are arranged respectively to cooperate with grooves 566 then in phase. Tension springs 598, 598 connected between each pawl and an arm of the lever 590 urge the pawls into operative relation with the grooves 566, the lever 590 being yieldingly urged counterclockwise as viewed in Fig. 3 by a tension spring 600 having its upper end affixed to a tab on the sleeve 280. The arrangement is such that no feeding occurs during the down stroke of the driver bar 350 but only during its upstroke, i.e., in returning from its position shown in Fig. 6 to that shown in Fig. 3. For this purpose an end of an arm 602 of the lever 590 is arranged to be engaged by the lower portion of the cam surface 446 to move the lever 590 clockwise as viewed in Fig. 3. The consequent raising of the pawls 596, 596 is more than sufficient to rotate the wheels 562, 564, counterclockwise as seen in Fig. 3 to advance the leads of the next resistor to be formed for insertion into exact register with the grooves 410. Spring backed detents 604, 604 (Fig. 2) recessed in the casing 374 are thereby dislodged endwise respectively from one pair of corresponding grooves 566 and reseated in a succeeding pair of corresponding grooves 566, further travel of the driver bar toward the end of its upstroke thereafter merely resulting in lost counterclockwise (as viewed in Fig. 3) pivotal movement of the pawls. This is to say that the arrangement is such that after the leads of the next resistor have been advanced and registered with the grooves 410 by the then bottommost corresponding grooves 566 of the feed wheels, the spring-backed detents 604 are reseated to maintain the positioned leads in such register; the thrust of the pawls 596 as they are carried heightwise and swing counterclockwise exactly indexes the feed wheels, and thereafter any counterclockwise movement of the pawls resulting from said further upstroke of the driver bar is without effect on the feed wheels. For adjustably determining the upper limit of the driver bar on its retraction, a rod 606 (Fig. 1) depending from the front end of lever 298 threadedly supports a stop nut 608 engageable with the frame 260 and a lock nut 610. During the down stroke of the driver bar the spring 600 is permitted to move the lever 590 counterclockwise so that the pawls may engage another pair of grooves 566 preparatory to further component feeding. It will be understood that the engagements of the pickup pin 382 with the dowel pins 386, 388 and of the pickup pin 384 with the dowel pins 392, 394 during the upstroke of the driver bar will return all operating parts of the head 22 to their initial positions in readiness for the next component to be inserted.

Feeding and insertion of components having bodies mounted on upstanding lead portions may require special adaption of certain parts of the head 22. Figs. 13 to 16, inclusive, show certain modifications of parts found to be highly useful in installing, for example, successive components C of the type having a body in the form of a disk or ovoid capsule upstanding from its leads. A commonly used electronic component of this sort, for instance, is the hermetically sealed, fixed capacitor, for example the ceramic disk type illustrated. It will be apparent that head modifications may be varied appropriately to adapt the operating parts as may be dictated by differently shaped component bodies. A plurality of the components C, either concatenated or otherwise assembled, is fed successively to the operating zone on the head, as by means of a raceway 570 and the feed wheels 562, 564. The latter function, as above explained, is to exactly aline the opposite leads with the grooves 410 and the driver bar notches 452, but precaution must be taken to assure that the body of each component C will be positioned so as not to be impaired during its feeding and insertion. Even though the components C be fed along a straight track instead of over the delivery end curvature of a raceway there inevitably is a tendency for some bodies not to assume the same upright position but to be slightly inclined with respect to one another and hence be irregularly spaced even if their leads are uniformly spaced apart. Concave raceway curvature will, as shown, normally tend to close the intervals between adjacent and otherwise spaced component bodies. The present arrangement aims to identically position the successive bodies to be applied to the wiring boards and protect them from impairment. An endmost component body C to be applied will first engage the lower, vertical front face 612 of a Z-shaped lever 614, as shown in Fig. 13. This lever is pivotally mounted on a pin 616 fixed in the inside former 438. In order that the face 612 may yieldably be held vertical at the start of a machine cycle to position the endmost body C with its leads L extending to be sheared on the blocks 426 and thereafter be formed over the U-shaped inside former portion 442, a torsion spring 618 mounted on a pin 620 secured to the inside former has one end received in a bore formed in the lever 614 and its other end abuts a flat formed on on an inside portion of the inside former. Clockwise movement of the lever 614 (as viewed in Fig. 13) is limited by the rear upper end of the lever abutting a vertical flat surface formed on the inside former, another vertical portion of which is then held, it will be recalled, against the back portion 444 of the driver bar.

After the leads L of the endmost component C have been cut and formed much in the manner hereinbefore described, a modified driver bar 622 continues its descent to effect insertion of the formed leads endwise without exerting any appreciable force on the component body. The driver bar 622 has a rather large recess in its lower end to accommodate the body, is provided with a bottom cam surface 624 to assure that the body is made erect and will not be jammed by the descending driver bar, and is further provided with an upwardly and forwardly extending cam surface 626 which acts to back off the body of a component next to be applied from the path of the driver bar. As shown in Figs. 14 and 15 and previously described, the inside former 438 is pivoted counterclockwise in the head as permitted by the drive bar cam slot 446 to clear the way for the operating stroke of the driver bar together with the component and the outside formers 402. Since it is important to precise insertion that the formed lead legs be guided by the outside formers very close to, if not directly on, the upper surface of the wiring board 20, the outside formers are preferably projected downwardly with the driver bar from the head until they engage or very nearly engage the board as indicated in Fig. 16. Suitable adjustment for this purpose is effected by means of the clamping screws 378 being loosened and then retightened to hold the casing 374 and its stops 422 and 430 at the appropriate level. Construction and operation of both the feeding means and an optionally solid anvil 613 remain as hitherto explained. To prevent the lever 614 from extending into the driver bar cam slot 446 and thereby becoming jammed during retraction of the driver bar, a projection 630 in the lever 614 extends outwardly on opposite sides thereof to be engaged by the rear of the driver bar as shown in Fig. 15.

It will be apparent from the above that this invention provides a highly adaptable, compact, and reliable machine for installing components safely and rapidly.

Having thus described our invention, what is claimed as new and desired to be secured by Letters Patent of the United States is:

1. In a machine for cutting, forming, and inserting the leads of lead bearing components, a driver bar having an end formed to engage the leads of a component adjacent to its body portion, outside former tools mounted for relative movement adjacent to the driver bar and respectively having operative connection therewith, lead cutting tools mounted for relative movement with respect to the outside former tools and said driver bar, and power means for operating said driver bar, cutting tools and former tools in sequence.

2. In a machine for cutting, forming, and inserting the leads of lead bearing components, a reciprocable driver bar having an end constructed to engage the leads of a component adjacent to its body portion, outside former tools mounted for relative movement adjacent to the driver bar and respectively having operative connection therewith, lead cutting tools mounted for relative movement with respect to the outside former tools and having cutting edges spaced therefrom, and means for actuating said cutting tools operable by said driver bar to sever the leads prior to their being operated on by said formers.

3. In a machine for cutting, forming, and inserting the leads of lead bearing components, an anvil and lead forming mechanism in register therewith, a frame for supporting the anvil and said mechanism for cooperative movement with respect to one another along an axis, said mechanism being adjustably supported by the frame for turning movement about said axis independently of said anvil, and means for supporting a work piece between said anvil and said mechanism for receiving the formed leads to be clinched.

4. In a machine for cutting, forming, and inserting the leads of lead bearing components, a head, a reciprocable driver bar guided for movement therein toward and from a workpiece, a pair of outside formers normally movable in the head with the driver bar during a portion of its operating stroke, and a pair of lead cutting tools normally movable in the head with the driver bar during a shorter portion of its operating stroke.

5. In a machine for cutting, forming, and inserting the leads of lead bearing components, a head, a reciprocable driver bar guided for movement therein toward and from a work piece, a pair of outside formers normally movable in the head during an initial and intermediate portion of the operating stroke of the driver bar and having operative connection therewith, and a pair of lead cutting tools normally movable in the head only during the initial portion of the operating stroke of the driver bar and having operative connection therewith.

6. In a machine for cutting, forming, and inserting the leads of lead bearing components, a reciprocable driver bar mounted for movement toward and from a work piece, a pair of outside formers and a pair of cutting tools operable in paths substantially parallel with that of said driver bar, means normally associated with the driver bar for separately operating said formers and said cutting tools, and mechanism for disassociating said operating means from the driver bar at different points in its operating stroke whereby the operation of said formers and tools is terminated.

7. A machine for cutting, forming, and inserting the leads of lead bearing components comprising a casing, a reciprocable driver bar therein having oppositely disposed locking recesses, a pair of members respectively slidable in said head adjacent to the driver bar, a pair of outside formers detachably connected to one of said members, a pair of lead cutting tools detachably connected to the other of said members, detects respectively associated with said members and disposed for cooperation with said locking recesses when the driver bar is retracted, and stops respectively disposed to be engaged by said members during the operating stroke of said driver bar successively to unlock said detents from said recesses.

8. In a machine for cutting and forming the oppositely extending leads of successive lead bearing components, lead cutting and forming instrumentalities, means for conducting a series of the components sidewise in a row in generally parallel relation toward the operating zone of said instrumentalities, and a pair of rotary, toothed feed wheels operative adjacent to said component conducting means and respectively mounted simultaneously to engage portions of the leads of several successive components to feed them from said conducting means and position them relatively to said operating zone.

9. In a machine for cutting and forming the oppositely extending leads of successive lead bearing components, lead cutting and forming instrumentalities constructed to operate on the leads of successive components, power means for operating said instrumentalities, a raceway having a curved delivery end portion for guiding a series of the components sidewise in a row in generally parallel relation toward the operating zone of said instrumentalities, and a pair of feed wheels operative adjacent to the curved delivery end portion of the raceway for acting on the opposite ends of a succession of the leads positively to feed them successively into said operating zone.

10. A machine as set forth in claim 9 and further characterized in that said feed wheels have operative connection with said power means to rotate them in time relation to the operating strokes of said instrumentalities.

11. In a machine for cutting, forming, and inserting the leads of lead bearing components in a work piece, means for supporting the work piece, lead cutting, forming and inserting instrumentalities mounted respectively for movement with respect to said supporting means and constructed to operate in sequence on the leads of successive components, a raceway for guiding the components successively toward the operating zone of said instrumentalities, said raceway having an arcuate delivery end adjacent to said zone but spaced from said work supporting means, and at least one feed wheel adjacent to said delivery end and constructed to transfer components from the raceway delivery end successively into said operating zone, said wheel having a curvature approximating that of the raceway delivery end and a perimeter formed to engage simultaneously a plurality of said components.

12. In a machine for cutting, forming and inserting the leads of lead bearing components in a work piece, means for supporting the work piece, lead cutting, forming and inserting instrumentalities mounted respectively for movement with respect to said supporting means and to operate in sequence on the leads of successive components, power means for thus operating said instrumentalities, a raceway for guiding the components successively toward the operating zone of said instrumentalities, said raceway having an arcuate delivery end adjacent to said zone but spaced from said work supporting means, and at least one feed wheel adjacent to said delivery end and constructed to transfer components from the raceway delivery end successively into said operating zone, said wheel having a curvature approximating that of the raceway delivery end and a perimeter formed to engage and feed simultaneously a plurality of said components, said power means having operative connection with said wheel to turn it intermittently.

13. In a machine for forming and inserting the leads of lead bearing components, reciprocable lead forming instrumentalities constructed to operate on the leads of successive components to be inserted, a reciprocable driver bar constructed to engage the formed leads to be inserted, said forming instrumentalities respectively having grooved portions to receive and form the leads and then cooperate with the driver bar in effecting their insertion, and a rotary means for successively advancing and positioning the oppositely extending leads of each of the components in register with the path of said grooved portions.

14. In a machine for forming and inserting the leads of lead bearing components, reciprocable lead forming instrumentalities constructed to operate on the leads of successive components to be inserted, a reciprocable driver bar constructed to engage the formed leads to be inserted, said forming instrumentalities respectively having grooved portions to receive and form the leads and then cooperate with the driver bar in effecting their insertion, and a rotary means for successively advancing and positioning the oppositely extending leads of each of the components in register with the path of said grooved portions, said means comprising a pair of feed wheels mounted for rotation in phase and respectively having peripheries formed simultaneously to engage the opposite end portions of the leads of several successive components.

15. In a machine for forming and inserting the oppositely extending leads of lead bearing components, a pair of movably mounted outside formers, said formers respectively having a groove to receive and form a lead of a component to be inserted, a driver bar mounted for reciprocable movement between said formers to cooperate therewith in effecting insertion of the formed leads, a pair of feed wheels respectively mounted to engage end portions of the leads of said components extending beyond the formers from said driver bar, said feed wheels having radial teeth provided with inclined faces for spacing the adjacent leads, and means for indexing said wheels to position successive spaced leads in register with the paths of said outside former grooves.

16. A machine as set forth in claim 15 and further characterized in that power means is provided for operating said driver bar and outside formers in time relation, and said indexing means has operative connection with said power means.

17. In a machine for inserting the leads of lead bearing components in a work piece, means for supporting the work piece, cyclical power means for driving the leads endwise through the supported work piece, a reciprocable anvil operable in time relation to said power means for upsetting said leads adjacent to the surface of the work piece, said anvil including spaced terminals, and a circuit including said terminals for controlling operation of said power means, said circuit being formed to prevent recycling of the power means upon failure of one of said leads to engage a terminal.

18. A machine for inserting the leads of lead bearing components in wiring boards comprising means for supporting a wiring board, a driver bar reciprocable toward and from the board cyclically, an anvil including spaced terminals reciprocable toward and from the board in time relation to the lead inserting strokes of the driver bar, fluid pressure operated means actuable against a return spring for thus operating said driver bar and the anvil, a circuit including a solenoid operated valve for controlling said fluid pressure operated means, said circuit including a normally open switch that is mounted automatically to be closed during the lead inserting stroke of the driver bar to cause said valve to require that the fluid pressure operated means maintain the driver bar at an extremity of its stroke, and a circuit including said terminals effective when closed to break the circuit for controlling said fluid pressure operated means and allow return of the driver bar under the influence of said return spring, said terminals being mounted to be electrically connected by the driver bar and end portions of the inserted leads respectively engaging said terminals.

19. A machine as set forth in claim 18 and further characterized in that time delay mechanism is provided for delaying the breaking of the circuit controlling said fluid pressure operated means to insure clinching of said leads.

20. In a machine for inserting the leads of lead bearing components in wiring boards, means for supporting a wiring board, a reciprocable driver bar operable to thrust the leads of a component endwise through a supported board, a reciprocable anvil mounted to be engaged by the inserted leads to clinch them adjacent to the workpieces, power means for operating the driver bar and the anvil cooperatively toward and from the workpiece, and independent means for adjusting the length of the reciprocable stroke of the anvil and of the driver bar respectively.

21. A machine for cutting, forming and inserting the leads of lead bearing components in a work piece comprising a casing, a driver bar movably mounted therein having an end formed to engage and insert the formed leads of a component, a pair of actuating blocks slidably mounted in the casing adjacent to the driver bar, a pair of outside formers respectively having mortise and tenon connection with one of said blocks, a pair of cutters respectively having mortise and tenon connection with the other of said blocks, means operatively connecting said blocks with the driver bar, and means for respectively limiting the operating strokes of said cutters and outside formers with respect to that of the driver bar.

22. A machine as set forth in claim 21 and further characterized in that said mortises extend transversely of the driver bar, said cutters and formers having tenons respectively adjustable in said mortises, and a pair of shear blocks mounted for transverse adjustment in said casing for cooperation with said cutters.

23. In a machine for applying components of the type having bodies upstanding from their leads, a driver bar having an end formed to bear on the leads of a component and recessed to accommodate its body, a pair of outside formers movably mounted adjacent to the driver bar to prepare the component for the applying stroke of said driver bar, an inside former mounted releasably to support the component by its leads for action thereon of the outside formers, and a member yieldably mounted on the inside former and disposed to be engaged by the body of the component to position the body during lead formation.

24. In a machine for applying components of the type having bodies upstanding from their leads, means for supplying said components in succession, and a reciprocable driver bar operable on successive components supplied by said means, said bar having a recess to accommodate the successive bodies of the components while acting only on their leads and having two cam surfaces, one being disposed to position each body in said recess and the other being disposed to move each succeeding component body out of the path of movement of said driver bar.

25. A machine for applying components of the type having bodies upstanding from their leads, means for supplying said components in succession, and a driver bar operable adjacent to the delivery end of said means and mounted to apply successive components to a workpiece, said driver bar having projecting portions formed respectively to engage non-upstanding portions of the leads of a component and a recess between the projecting portions for receiving the upstanding portions of its leads and body, and said bar also having an inclined extremity adjacent to said recess for positioning the component body therein and another inclined portion for assuring reception in said recess from said means of only one of said components at a time.

26. A machine as set forth in claim 25 and further characterized in that it is provided with a pair of outside formers mounted for cooperative movement with said projecting portions in forming and applying the leads of successive components to the workpiece, an inside former mounted for cooperation with said outside formers, and a member mounted on the inside former and disposed initially to extend into said driver bar recess for engagement with the body of the component to be applied, thereby to position it as desired prior to the cooperation of the outside formers and said driver bar.

27. In a machine for forming and inserting the leads of components of the type having bodies upstanding from their leads, a machine head, a driver bar mounted for reciprocation in and out of said head to insert the leads of successive components in workpieces, said bar having an end portion recessed to accommodate a component body, a pair of outside formers mounted to cooperate with the driver bar in effecting insertion of the leads, an inside former pivotally mounted in the head for cooperation with said outside formers in forming the leads to be inserted, and a member yieldingly mounted on said inside former and having a component body engaging surface disposed to extend within the recessed end portion of the driver bar to position the body of the component prior to lead formation, said inside former and member being mounted to be moved out of the path of movement of the recessed end portion of the driver bar during its inserting stroke upon engagement therewith.

28. A machine as set forth in claim 27 and further characterized in that said driver bar is provided with a surface cooperative during its retraction with said inside former to restore the latter and said member to positions in which they respectively engage the leads and body of the component next to be inserted.

29. In a machine for assembling lead-bearing electrical components on wiring boards, the combination with means for supporting a wiring board, a machine head including cooperatively related outside formers and a driver bar cyclically operable to place a component adjacent to one side of the supported wiring board and insert leads of the component therethrough, a tool disposed on another side of the wiring board to act on the inserted leads, and stop means adjustable to determine the limits of heightwise movement of said driver bar and outside formers above the supported wiring board, of feed wheels rotatably supported by said head for positioning the leads of successive components to be formed with respect to the path of said outside formers, and means for intermittently actuating said wheels to index the leads of the successive components in time relation to the operating strokes of the driver bar and said outside formers.

30. A machine as set forth in claim 29 and further characterized in that said feed wheels are notched peripherally and means is provided for adjustably limiting the extent of retraction of said driver bar from the wiring board to enable successive corresponding notches of said feed wheels to be registered with the path of said outside formers.

31. A machine for attaching electrical components to a circuit board comprising a conveyor for receiving a circuit board in a fixed position and operable to move the circuit board to a fixed component-receiving station, a component attaching head located at said component-receiving station, an inserter mounted on the head to carry a component against the board and insert its leads into openings in the board, a rotatable support for the inserter to permit rotation thereof relative to the head about an axis extending through the inserter, and means to lock the inserter in an adjusted rotational position so that the inserter may be adjusted and locked in a predetermined rotational position relative to the board to attach the component to the board in a selectable rotational position.

32. A machine for attaching electrical components to a circuit board comprising a conveyor for carrying a series of individual circuit boards to a plurality of attaching stations, means for positioning the board in a predetermined position at said stations, component attaching heads mounted at said stations, inserter members mounted on said heads, means to move each of said inserter members against the board to insert component leads into openings in the circuit board and rotatable mountings for at least some of the inserters with means for adjusting their rotational position so that each of said inserters may be rotated with respect to the others and to the board thereby permitting the boards to be conveyed to their predetermined stations to receive the components in varied rotational positions without changing the position of the boards.

33. A machine for attaching electrical components to a circuit board comprising a conveyor for carrying a series of individual component boards along a linear path to a plurality of attaching stations, attaching heads positioned at each of said stations, an inserter mounted on each attaching head for inserting leads of an electrical component into holes in the circuit board, means to move the inserter against the circuit board when it is stopped at the attaching stations, support means for the conveyor and attaching head, said attaching head being adjustable on the support means in a direction parallel to the path of the conveyor and in a direction perpendicular to the path of the conveyor, and means to rotatably adjust the position of the inserter so that with individual adjustment of the position of the attaching head and the inserter successive electrical components may be attached by successive attaching heads in different positions and locations on the circuit board without changing the position of the board with respect to the conveyor.

References Cited in the file of this patent

UNITED STATES PATENTS 1,534,141 Roesen ---------------- Apr. 21, 1925

FOREIGN PATENTS 618,788 Great Britain ----------- Feb. 28, 1949